US009911142B2

(12) United States Patent
Hannon et al.

(10) Patent No.: US 9,911,142 B2
(45) Date of Patent: Mar. 6, 2018

(54) CENTRALIZED DEPLOYMENT OF ADVERTISING CODE

(75) Inventors: Dale Hannon, Woodside, NY (US); Josef Blazej, East Brunswick, NJ (US); Mark A. Cohen, Ridgewood, NJ (US); Saravanan Kathiresan, Fords, NJ (US); Guy Laor, New York, NY (US); Roger Mayorga, West Milford, NJ (US); Horace Nelson, Brooklyn, NY (US)

(73) Assignee: VIACOM INTERNATIONAL INC., New York, NY (US)

( * ) Notice: Subject to any disclaimer, the term of this patent is extended or adjusted under 35 U.S.C. 154(b) by 1175 days.

(21) Appl. No.: 12/965,409

(22) Filed: Dec. 10, 2010

(65) Prior Publication Data

US 2012/0150662 A1 Jun. 14, 2012

(51) Int. Cl.
*G06Q 30/00* (2012.01)
*G06Q 30/02* (2012.01)

(52) U.S. Cl.
CPC .............................. *G06Q 30/0277* (2013.01)

(58) Field of Classification Search
CPC .................................................. G06Q 30/0276
USPC .......................................... 705/14.72; 14/73
See application file for complete search history.

(56) References Cited

U.S. PATENT DOCUMENTS

| 6,286,045 B1* | 9/2001 | Griffiths et al. ............... 709/224 |
| 6,401,075 B1* | 6/2002 | Mason et al. ............... 705/14.72 |
| 8,027,874 B2* | 9/2011 | Angles et al. ............... 705/14.4 |
| 2006/0156283 A1* | 7/2006 | Landau et al. ................. 717/114 |
| 2008/0201218 A1* | 8/2008 | Broder et al. ................... 705/14 |
| 2008/0262914 A1* | 10/2008 | Suveyke et al. ................ 705/14 |
| 2009/0024480 A1* | 1/2009 | Dai ........................ G06Q 30/02 705/14.5 |
| 2011/0145076 A1* | 6/2011 | Ramer et al. ............... 705/14.72 |

\* cited by examiner

*Primary Examiner* — Allan Woodworth, II
(74) *Attorney, Agent, or Firm* — Fay Kaplun & Marcin, LLP

(57) ABSTRACT

Described are computer-based methods and apparatuses, including computer program products, for centralized deployment of advertising code. Advertising code is stored for use by a web page, the advertising code comprising at least one of vendor advertising code or vendor reporting code. An application programming interface is provided for the web page to access the advertising code, the application programming interface allowing the advertising code to be updated such that updated advertising code is automatically provided to the web page without changing source code that the web page uses to accesses the advertising code. A request for advertising code is received from the web page using the application programming interface. The advertising code is determined to be a most recently updated version of advertising code stored by the computing device. A response to the request can be generated using the advertising code. The response can be transmitted to the web page.

18 Claims, 7 Drawing Sheets

202 → Site1.btg.config.ReportSettings={     200
       version : '2.0.213',

206A → ThirdParty1: {
       parameter1 : value,
       ...
       parameterN : value
}

...

206N → ThirdPartyN: {
       parameter1 : value,
       ...
       parameterM : value
}
};

204 → Site1.btg.config.AdSettings={

208A → ThirdParty1: {
       parameter1 : value,
       ...
       parameterN : value
}

...

208N → ThirdPartyN: {
       parameter1 : value,
       ...
       parameterN : value
}
};

FIG. 2

```
<head>          ←301              ←301A                                    300
<script type = "text/javascript" src =
  "http://btg.site1.com/adcode.html ? site=site1.com> </script>
</head>
                                               ↑
<body>                                        301B
<script type = "text/javascript">

// Initialize Controller
site1.btg.Controller.Init();  ←302

// Place Add              ←304
site1.btg.Controller.placeAd ({
          size: '728x90',
          contentType: "adj",  } 306
          loadorder: 1
          });

</script>
</body>
```

FIG. 3

```
<head>          401                    401A                              400
<script type = "text/javascript" src=
  "http://btg.site1.com/adcode.html?site=site1.com> </script>
</head>
                                            401B
<body>
<script type = "text/javascript">

// Initialize Controller      402
site1.btg.Controller.Init();

// Send a page call          404
site1.btg.Controller.sendPageCall ({
          pageName: 'index.jntml',   ⎫
          hier1: 'index.jhtml'       ⎬ 406
          });                        ⎭

</script>
</body>
```

FIG. 4

CENTRALIZED DEPLOYMENT OF ADVERTISING CODE

FIELD OF THE INVENTION

The present invention relates generally to computer-based methods and apparatuses, including computer program products, for centralized deployment of advertising code.

BACKGROUND

Online advertising has become a substantial revenue driver for many companies that offer products and/or services through the internet. Advertising not only generates revenue for the host companies but also serves as a critical tool for companies and businesses to promote products and services. For example, companies with high-traffic websites (the host companies) can charge a premium for advertising ("ad") space on their websites. Advertisers can invest in the available advertising space and post customized content to purchased advertising space. Advantageously, the host companies can generate revenue by selling ad space on their websites, and the advertisers can immediately publish information or customized content to a desired audience.

Third party companies (also referred to as vendors) offer both advertising and analytical solutions for host companies to facilitate, for example, ad placement and ad reporting. Advertising solutions (e.g., advertising vendors) serve video content and display the actual ads for an advertiser. Analytics tools can provide the business intelligence to, for example, inform on product development decisions and aid in the assessment of available ad inventory. For example, rating services for ad space can impact ad revenue (e.g., such services can impact the Cost Per Mille (CPMs) that a host company can charge for digital advertising). The proper functioning of these third party applications can have a direct impact on profitability.

Unfortunately, many of these third party applications require configuration, regular maintenance, and/or technical integration with a host company's website. These requirements (which are often brand specific) can be further compounded by software enhancements, updates, and bug fixes made to both the third party applications and how host companies integrate with the third party applications. All of these software configuration changes and underlying code changes need to be deployed throughout an entire host company's network. For example, if a host company operates ten different websites (e.g., each website is associated with a unique brand) then the host company needs to implement any software configuration changes and code changes ten separate times (once for each of the ten website). Such distributed implementations are often extremely inefficient to implement and maintain.

SUMMARY OF THE INVENTION

In one embodiment, the invention features an apparatus for automatically providing updated advertising code to a plurality of web pages. The apparatus comprising a computing device with a processor and memory configured to store advertising code for use by a web page, the advertising code comprising at least one of vendor advertising code or vendor reporting code. The apparatus is configured to provide an application programming interface for the web page to access the advertising code, the application programming interface allowing the advertising code to be updated such that updated advertising code is automatically provided to the web page without changing source code that the web page uses to accesses the advertising code. The apparatus is configured to receive a request for advertising code from the web page using the application programming interface. The apparatus is configured to determine the advertising code is a most recently updated version of advertising code stored by the computing device. The apparatus is configured to generate a response to the request using the advertising code, and transmit the response to the web page.

In another embodiment, the invention features a computerized method for automatically providing updated advertising code to a plurality of web pages. The method includes storing, by a computing device, advertising code for use by a web page, the advertising code comprising at least one of vendor advertising code or vendor reporting code. The method includes providing, by the computing device, an application programming interface for the web page to access the advertising code using source code, the application programming interface allowing the advertising code to be updated such that updated advertising code is automatically provided to the web page without changing the source code that the web page uses to accesses the advertising code. The method includes receiving, by the computing device, a request for advertising code from the web page using the application programming interface. The method includes determining the advertising code is a most recently updated version of advertising code stored by the computing device. The method includes generating, by the computing device, a response to the request using the advertising code. The method includes transmitting, by the computing device, the response to the web page.

In another embodiment, the invention features a computer program product, tangibly embodied in a non-transitory computer readable medium. The computer program product including instructions being configured to cause a data processing apparatus to store advertising code for use by a web page, the advertising code comprising at least one of vendor advertising code or vendor reporting code. The computer program product including instructions being configured to cause a data processing apparatus to provide an application programming interface for the web page to access the advertising code, the application programming interface allowing the advertising code to be updated such that updated advertising code is automatically provided to the web page without changing source code that the web page uses to accesses the advertising code. The computer program product including instructions being configured to cause a data processing apparatus to receive a request for advertising code from the web page using the application programming interface. The computer program product including instructions being configured to cause a data processing apparatus to determine the advertising code is a most recently updated version of advertising code stored by the computing device. The computer program product including instructions being configured to cause a data processing apparatus to generate a response to the request using the advertising code, and transmit the response to the web page.

In other examples, any of the aspects above can include one or more of the following features. Updated advertising code can be received for use by the web page instead of the advertising code, the updated advertising code can be stored, a second request for advertising code can be received from the web page using the application programming interface, the updated advertising code can be determined that it is the most recently updated version of advertising code stored by the computing device, and a second response can be generated to the second request using the updated advertising code.

In some examples, a testing server is in communication with the computing device configured to determine updated advertising code is ready for testing, and test the updated advertising code before uploading the updated ad code to the computing device. A second testing server can be in communication with the first testing server and the computing device configured to store the updated advertising code after completing a portion of testing, and store a backup of the advertising code when the updated advertising code is uploaded to the computing device so the backup of the advertising code can be reverted back to if the updated advertising code includes one or more errors. A database in communication with the computing device is configured to store one or more configuration parameters for each web page accessing the advertising code that can be set to customize the advertising code for each web page.

In other examples, the advertising code is stored for use by a plurality of web pages. The application programming interface can include one or more advertising functions for manipulating an advertisement on the web page, and one or more configuration parameters that can be set for the web page to customize the advertising code for the web page. The application programming interface can include an advertising function for placing an advertisement in a webpage that is configured such that when the advertising function is executed by a web page, the advertising function calls a portion of the vendor advertising code based on the one or more configuration parameters for the web page.

In some examples, the application programming interface includes one or more reporting functions for monitoring data related to an advertisement on the web page, and one or more configuration parameters that can be set for the web page to customize the advertising code for the web page. The application programming interface can include a reporting function for reporting one or more statistics for an advertisement in the web page that is configured such that when the reporting function is executed by the web page, the reporting function calls a portion of the vendor reporting code based on the one or more configuration parameters for the web page. The use of the advertising code by a plurality of web pages can be monitored. Storing can include receiving a file transfer protocol publication including the advertising code.

In other examples, updated advertising code is received for use by the web page instead of the advertising code, the updated advertising code is stored, a second request for advertising code is received from the web page using the application programming interface, the updated advertising code is determined to be the most recently updated version of advertising code stored by the computing device, and a second response to the second request is generated using the updated advertising code.

In some examples, a request is received comprising data indicative of a function call implemented by the application programming interface from a second web page, and it is determining whether to service the function call based on the second web page. Determining can include determining whether the second web page is authorized to use the advertising code, if the second web page is authorized to use the advertising code, transmitting a reply to the second web page based on the advertising code, and if the second web page is not authorized to use the advertising code, transmitting a blank response to the second web page.

In other examples, it is determined that updated advertising code is ready for testing, and the updated advertising code is tested before uploading the updated advertising code to the computing device. The updated advertising code can be uploaded to the computing device if the updated advertising code completed testing by one or more web pages. Testing can include receiving a second request for advertising code from a second web page using the application programming interface, wherein the request includes a cookie including data indicative of the second web page requesting the updated advertising code, and generating a second response to the to the second web page using the updated advertising code so the second web page can test the update.

The techniques, which include both computerized methods and apparatuses, described herein can provide one or more of the following advantages. Websites can be configured to include function calls (e.g., for ad placement and for ad reporting) to an ad code library that is loaded at run-time. Advantageously, because the websites only use function calls and do not implement the underlying advertisement code, the underlying code to the functions can be changed without making any changes to the website code. A database can store configuration data for each specific website, allowing a single ad code deployment to be offered that can still be customized for the individual needs of each website. The ad code can be uploaded to a data repository from where it is requested by websites, so if the data repository goes down, the origin server(s) are not compromised. Further, the centralized ad code system can be configured to test staging ad code builds before the ad code is deployed for actual use by live websites.

Other aspects and advantages of the present invention will become apparent from the following detailed description, taken in conjunction with the accompanying drawings, illustrating the principles of the invention by way of example only.

BRIEF DESCRIPTION OF THE DRAWINGS

The foregoing and other aspects, features, and advantages of the present invention, as well as the invention itself, will be more fully understood from the following description of various embodiments, when read together with the accompanying drawings.

FIG. 2 is a diagram of an exemplary website configuration data record for the centralized ad code deployment according to the present invention;

FIG. 3 is a diagram of exemplary web site code for placing an advertisement using the centralized ad code deployment according to the present invention;

FIG. 4 is a diagram of exemplary web site code for reporting using the centralized ad code deployment according to the present invention;

DETAILED DESCRIPTION

Computerized systems and methods are provided for a centralized ad code deployment solution. Ad code is code used, for example, to place advertisements or advertisement content in a web page and/or to report data related to advertisements (e.g., often, as is described below, the ad code is provided by third party companies). An application programming interface allows web pages to call methods that are implemented through centralized ad code. The computerized systems and methods provide for integrated automated testing of the ad code, network-wide monitoring of online ads placed using the ad code, and an ad code versioning system that facilitates determining which features and vendors are supported for a given brand (or website). Usage data and advertisements can be run across an entire network for a company (e.g., rather than servicing individual sites for large company networks, which are often spread out over different time zones and geographical locations).

Figure 1:
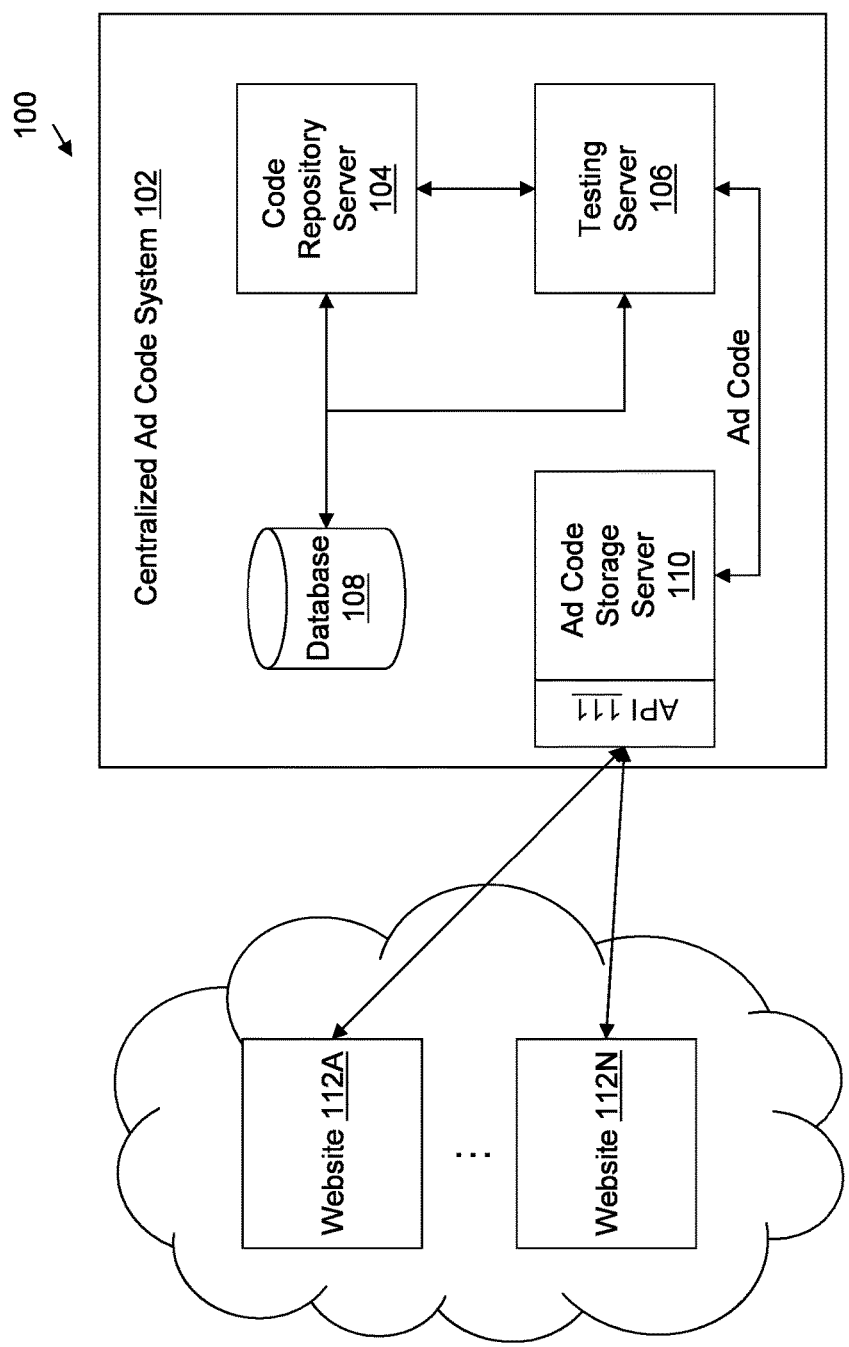
FIG. 1 is a diagram of an exemplary system for centralized ad code deployment according to the present invention.

FIG. 1 is a diagram of an exemplary system 100 for centralized ad code deployment according to the present invention. The system 100 includes a centralized ad code system 102. The centralized ad code system 102 includes a code repository server 104. The code repository server 104 is in communication with testing server 106. The code repository server 104 and the testing server 106 are in communication with a database 108. The database 108 can be, for example, data storage space located within a hard drive or other type of long-term storage device (e.g., flash memory), or a group of long-term storage devices (e.g., a redundant array of inexpensive disks (RAID)). The database can be implemented as, for example, a relational database (e.g., an SQL database). The testing server 106 is also in communication with an ad code storage server 110, which presents the application programming interface 111 to website 112A through website 112N (collectively websites 112).

As a general overview, the code repository server 104 stores the ad code and any incremental changes made to the ad code. Once code changes stored in the code repository server are ready for testing, the testing server 106 tests the updated ad code. If the updated ad code passes testing, the testing server 106 uploads the updated ad code to the ad code storage server 110. The websites 112 request ad code from the ad code storage server 110 using the application programming interface 111. The ad code storage server 110 transmits ad code to the websites 112 in response to the requests. The application programming interface 111 is configured such that the ad code storage server 110 always transmits the most recently updated ad code stored on the ad code storage server 110 without requiring any changes to the websites 112. For example, as will be further explained below, the websites 112 include function calls implemented through the ad code stored on the ad code storage server 110. Advantageously, because the websites 112 only include function calls, the underlying code to the functions can be changed without making any changes to the website 112 code (e.g., the website 112 automatically requests and executes the most recently updated ad code from the ad code storage server 110).

While FIG. 1 shows an exemplary embodiment of the present invention, one skilled in the art can appreciate that the components of the centralized ad code system 102 can be configured in other ways without departing from the spirit of the present invention. For example, while only one ad code storage server 110 is shown in FIG. 1, the centralized ad code system 102 can include a plurality of ad code storage servers 110. As another example, the websites 112 can also communicate with the testing server 106 to request test versions of the ad code (e.g., for testing purposes).

The code repository server 104 includes a processor and memory and is configured to serve as a code repository for the ad code. The code repository server 104 stores the code being used for development of the centralized ad code system. For example, changes, additions, and/or deletions are made to the ad code in the code repository server 104 as the ad code is developed and evolved (e.g., to add new features, fix bugs, etc.). Versions of the ad code in the code repository server 104 are created by the centralized ad code system 102. The testing server 106 tests the new versions of the ad code. The successfully tested versions of ad code are published to the ad code storage server 110 for actual use by websites 112.

The ad code can be, for example, a code library (e.g., a javascript library) that includes third party code and a layer of abstraction. The layer of abstraction allows developers to simply invoke methods provided by the API 111 without needing to understand (or worry about) which vendors are used for a particular method. The abstraction layer can include code to manage and deploy the third party code (software). For example, the ad code can include javascript code that coordinates the use of the third party (e.g., vendor) code for use by a particular website 112. This code is further described below with reference to the API 111.

The third party code in the code repository server 104 can include third party ad code that includes vendor advertising code and/or vendor reporting code. For example, the ad code can include code with advertising functions for manipulating an advertisement on a web page and/or code with reporting functions for monitoring data related to an advertisement on the web page. Exemplary third party software includes ad software and/or reporting software engineered by Google, Inc. (e.g., DoubleClick or Google Analytics), FreeWheel Media Inc., Adobe Systems Inc. (e.g., Adobe's Online Marketing Suite), Quantcast Company, The Nielsen Company, and comScore, Inc.

The ad code can provide a namespace to prevent variable collisions. For example, the ad code API can specify a format for displaying ad tags, the ad code API can provide methods for placing and manipulating ads (e.g., that are implemented using one or more third party ad placement products), and the ad code API can enable synchronization of ad targeting and reporting values (e.g., that are implemented using one or more third party reporting methods).

The testing server 106 includes a processor and memory configured to test the ad code in the code repository server 104. For example, when the centralized ad code system 106 detects updated ad code in the code repository server 104 that is ready for testing (e.g., a new version of the ad code), the testing server 106 facilitates testing of the updated ad code. The testing server 106 can take the updated ad code and incorporate any website-level configuration information (e.g., for individual websites 112) and global configuration information to create a testable version of the updated ad code. The centralized ad code system 102 can use, for example, plug-ins to the code repository server 104 to monitor the ad code stored in the code repository server 104 for changes (e.g., a Hudson job for a Subversion code repository). The centralized ad code system 102 can output a new ad code version (e.g., a version that includes javascript class files and third party software components rendered as a minified javascript application file) to the testing server 106.

The database 108 stores configuration data (e.g., configuration data for each of the websites 112). The configuration data can be specific to, for example, each website 112 (e.g., specific for each brand, where each website is associated with a brand). For example, configuration parameters can vary between brands, such as the account identifiers, core features (e.g., which features are enabled or disabled), and other configuration parameters associated with a brand. Advantageously, the database 108 can store configuration data for each specific website 112, allowing a single ad code deployment to be offered through the ad code storage server 110 that can still be customized for the individual needs of each website 112.

If the configuration data in the database 108 is changed (e.g., via a website 112), a change script can invoke a build process (e.g., a Hudson build process) that creates updated configuration code and adds the configuration code (and any other website-specific code) to the updated ad code stored on the testing server 106. For example, a javascript build file can be created for each of the websites 112, where each javascript is configured individually for an associated website based on the configuration data stored in the database 108. The testing server 106 can include one or more computing devices to perform the ad code testing. In some embodiments, the testing server 106 includes a first testing server (not shown) that tags a candidate updated ad code release and generates a configured ad code build file for the tagged release. The testing server 106 can include a second testing server (not shown) to which the first testing server publishes the configured ad code build file. The second testing server can publish the updated ad code (e.g., upon successful testing) to the ad code storage server 110.

FIG. 2 is a diagram of an exemplary website configuration data record 200 for the centralized ad code deployment according to the present invention. The configuration data record 200 includes a report settings section 202 that provides configuration parameters for reporting functions associated with a website 112. The configuration data record 200 includes an ad settings section 204 that provides configuration parameters for ad placement functions associated with a website 112.

The report setting section 202 includes one or more third party vendor report configuration sections 206A through 206N (collectively referred to as report configuration sections 206). Each report configuration section 206 includes one or more parameters with associated values. Report configuration section 206A includes parameter1 through parameterN, where N is any positive integer. Report configuration section 206N includes parameter1 through parameter M, where M is any positive integer, and where M may or may not be different from N. As an example, the centralized ad code system 102 can support a plurality of third party reporting programs. A website 112 can use the reporting section 202 to define which of the plurality of third party reporting programs are to be used for the website, and can specify parameters to customize the selected third party reporting programs for the website.

The report setting section 202 can include configuration parameters for reporting third party vendors (e.g., for all vendors supported by the centralized ad code system 102 and/or for the vendors used by the website 112 associated with the report settings section 202). Each report configuration section 206 can correspond to configuration parameters for a third party software package included in the ad code. For example, report configuration section 206A can include the configuration parameters for Omniture software used by the centralized ad code system, report configuration section 206N can include the configuration parameters for Nielsen software, etc. The parameters can include, for example, a parameter that indicates whether a report configuration section 206 is enabled (e.g., whether the particular third party software is enabled for the website 112), an account name for the third party software, an identification name and/or number for the third party software, a label used with the third party software, and/or any other configuration parameters used to configure the ad code for use by the website 112. For a detailed example, a report configuration section 206 can be for Omniture reporting software, and the report configuration section 206 can include the parameters "enabled: true", "account: 'account name'", dynamicAccountSelection: 'true', "dynamicAccountList: 'devviasite1=site1-d, site1-q, site1-jd, site1-jq, site1x-d, site1x-jd'", linkInternalFilters; 'javascript: site1.com, site1x.com, site1y.com'", and "enableVisitorNamespace: false."

The ad setting section 204 includes one or more third party vendor ad configuration sections 208A through 208N (collectively referred to as ad configuration sections 208). Each ad configuration section 208 includes one or more parameters with associated values. Ad configuration section 208A includes parameter1 through parameterN, where N is any positive integer. Ad configuration section 208N includes parameter1 through parameter M, where M is any positive integer, and where M may or may not be different from N. A website 112 can use the ad setting section 204 to define which of a plurality of third party ad programs are to be used for the website, and can specify parameters to customize the selected third party ad programs for the website.

Advantageously, an ad website 112 can use the configuration data record 200 to define specific settings for the ad website 112. For example, a website 112 can specify which third party ad software to execute for the website 112, which third party reporting software to execute for the website 112, and the website 112 can define customized parameters for each of the invoked third party software applications. Therefore, each website 112 can define a unique configuration data record 200 to customize the ad code provided by the centralized ad code system 102 for the website 112.

The ad code storage server 110 can be a file transfer protocol (FTP) repository (e.g., Akamai net storage). For example, traffic load for websites is often absorbed using a content delivery network (CDN). Therefore, a website may have N web servers (where N is any positive integer) to post content to an internet browser for a particular uniform resource locator (URL, e.g., www.mysite.com). If a website receives millions of hits from browsers, it is advantageous to have a CDN in front of the origin servers to push out cached versions of the websites to requesting browsers. If the browsers need new content (e.g., something that is not stored in a cached version on the CDN) the websites go to an origin server for any updates. In contrast to using origin servers, the centralized ad code system 102 in some embodiments uses the ad code storage server 110 to prevent trafficking back to the origin server (e.g., the ad code storage server 110 is an FTP that has content loaded to it with a push model). Advantageously, if the ad code storage server 110 goes down, the origin server(s) are not compromised.

The API 111 defines an interface for the websites 112 to access the ad code stored in the ad code storage server 110 (e.g., ad functions and reporting functions). Advantageously, for example, by calling a single ad or reporting function in the website 112's code, the code behind the function is implemented by the ad code of the centralized ad code system 102. For example, the ad code in the code repository server 104 can include many different types of third party vendor advertising and/or reporting applications (each application often having different configuration parameters and requirements). The API 111 can present clearly defined methods (e.g., which receive any necessary parameters when called). When a website 112 invokes a method defined by the API 111, the ad code provided by the centralized ad code system 102 associated with the method is executed (e.g., by the browser that loaded the web page of the website 112). The methods can, for example, coordinate how and/or which third party vendor applications are used when a particular website 112 calls a function from the API 111. The websites 112 can define configuration data that is used by the ad code to customize any API 111 methods for a website 112 (e.g., when an API 111 method is invoked by a website 112). Configuration data is described above with respect to the database 108. Advantageously, one or more configuration parameters that can be set for the website's 112 web pages to customize the advertising code for the web page.

The API 111 can include one or more advertising functions for manipulating an advertisement on the web page. For example, the API 111 can include an advertising function for placing an advertisement in a webpage. The advertising function can be configured such that when the advertising function is executed by a web page (e.g., when the code of website 112 is executed that includes the advertising function), the advertising function calls a portion of the third party vendor advertising code based on the one or more configuration parameters for the web page. For example, based on the configuration parameters for a particular website 112, when the website 112 invokes an advertising function implemented by the API 111, the ad code executes the associated code for the advertising function. For example, if website 112 is configured to use one third party vendor advertising applications, then the ad code will only invoke the advertising application associated with that one vendor (e.g., even if the ad code supports multiple different vendor advertising applications).

FIG. 3 is a diagram of exemplary web site code 300 for placing an advertisement using the centralized ad code deployment according to the present invention. The website code 300 includes a head tag (i.e., <head> through </head>) and a body tag (i.e., <body> through </body>). The head tag includes a script tag 301 which includes a source attribute 301A and a site attribute 301B. The website code 300 (which resides within a website 112) includes two method calls. The first method called is the init method 302, which initializes the ad and report settings for the website 112 (e.g., using a configuration data record similar to that shown in FIG. 2 for the website 112). The init method 302 requests the latest ad code library for the website, as is described in FIGS. 2-3. In some embodiments, since the init method 302 initializes the reporting and ad scripts and values that are needed for reporting and ads for the website 112, the init method 302 only needs to be called once in a webpage of website 112.

The second method called is the placeAd method 304, which places an advertisement within the website 112 using the parameters 306, which include the size of the advertisement of 728 pixels wide by 90 pixels high, the content type of "adj" and the load order of one (which can be used to override the "tile" for an advertisement). While only three parameters 306 are shown in the ad code, any number of parameters can be passed to the ad code via the application programmer interface (which implements the methods, including the init method 302 and the placeAd method 304). For example, a parameter can be added to the placeAd method that indicates the ad is a reloadable ad.

The two methods are implemented by the ad code in the centralized ad code system 102. Therefore, the methods are provided as part of the API provided by the centralized ad code system 102. Advantageously, as will be described below with reference to FIG. 7, the underlying code for the methods called within a website 112's code can be changed or modified without requiring any changes to the actual code in the website 112.

The API 111 can include one or more reporting functions for monitoring data related to an advertisement on the web page. Advantageously, the centralized ad code system 102 can monitor the use of the advertising code by web pages associated with the plurality of websites 112. For example, the API 111 can include a reporting function for reporting one or more statistics for an advertisement in a web page of a website 112. The reporting function can be configured such that when the reporting function implemented by the API is executed by the web page, the reporting function calls a portion of the vendor reporting code based on the one or more configuration parameters for the web page. For example, based on the configuration parameters for a particular website 112, when the website 112 invokes a reporting function implemented by the API 111, the ad code executes the associated reporting code for the reporting function. For example, if website 112 is configured to use three third party vendor reporting applications, then the ad code will invoke the reporting applications associated with the three vendors.

FIG. 4 is a diagram of exemplary website code 400 for reporting using the centralized ad code deployment according to the present invention. The website code 400, like the website code 300, includes a head tag and a body tag. The head tag includes a script tag 401 which includes a source attribute 401A and a site attribute 401B. The website code 400 (which resides within a website 112) includes two method calls. The first method called is the init method 402, which initializes the ad and report settings for the website 112 (e.g., similar to the init method 302 of FIG. 3). For example, the init method 402 can set parameters for the third party vendor reporting applications. The second method is the sendPageCall method 404, which sends a reporting page call to the third party vendor reporting applications associated with the website 112 (e.g., as configured via configuration information associated with the website and/or as set up through the init method 402). The sendPageCall method 404 includes parameters 406, which include the page name of the page call, which is "index.jntml", and a hier1 value of "index.jhtml."

The reporting methods can also include any other type of reporting methods implemented by one or more of the third party vendor reporting applications. For example, a method can be used to send link events (e.g., to indicate that a link was selected in a webpage). In some examples, the reporting methods can include additional parameters that further describe the type of event being reported (e.g., a title, a channel, etc.).

The websites 112 request the ad code from the ad code storage server 110. For example, website 112A requests ad code from the ad code storage server 110 that may include configurations specific to website 112A (e.g., incorporates configuration parameters for website 112A that are stored in database 108), and website 112N can request ad code from the ad code storage server 110 that is specific to website 112N. The ad code storage server 110 can respond to requests from websites 112 with, for example, a configured javascript library for the websites 112.

The websites 112 can request the ad code by passing a site parameter that the ad code storage server 110 uses to identify the ad code library for the particular website 112. For example, as shown in FIG. 3 website 112A transmits a request for ad code to the ad code storage server 110 located at source attribute 401A for the website indicated by the site attribute "site=site1.com." The ad code storage server 110 determines the particular ad code library associated with the site parameter "site1.com" and transmits the ad code library to website 112A. In some examples, the ad code storage server 110 may not identify a match between a stored ad code library and the site parameter included in a website 112's request for ad code. If there are no associated ad code libraries for a particular site parameter, the ad code storage server 110 can transmit a response to the website 112 based on such a determination. For example, the ad code storage server 110 can transmit an empty response (e.g., a 204 response). Advantageously, the ad code storage server 110 can determine what content to include in a response to a website 112A based on site parameters passed to the ad code storage server 110 in the query string. Such decision logic can allow the ad code storage module 110 to control what information is transmitted to a website 112.

The websites 112 can be configured to request ad code for testing purposes. For example, the websites 112 can set a test parameter (e.g., a parameter passed in a request to the ad code storage server 110 or an authorization cookie set for the requesting website 112) in a request to the ad code storage server 110 that indicates to the ad code storage server 110 that the website is requesting to test a new ad code build (e.g., in a production environment). For example, if website 112A transmits a request with the site parameter for the website 112A (e.g., "site=site1.com") and with the test parameter set (e.g., "test=true," "stage=1"), the ad code storage server 110 transmits a staging ad code build (the ad code build that is being tested but not yet ready for use) in response to the websites 112 request. In some examples, the staging ad code build is stored on the testing server 106. A request with a set test parameter can be re-routed to the testing server 106 such that the testing server 106 transmits the staging ad code build to the requesting website 112A. Advantageously, the centralized ad code system 102 can test staging ad code builds (e.g., in a production environment for testing before the staging ad code build is deployed for actual use by live websites).

Figure 5:
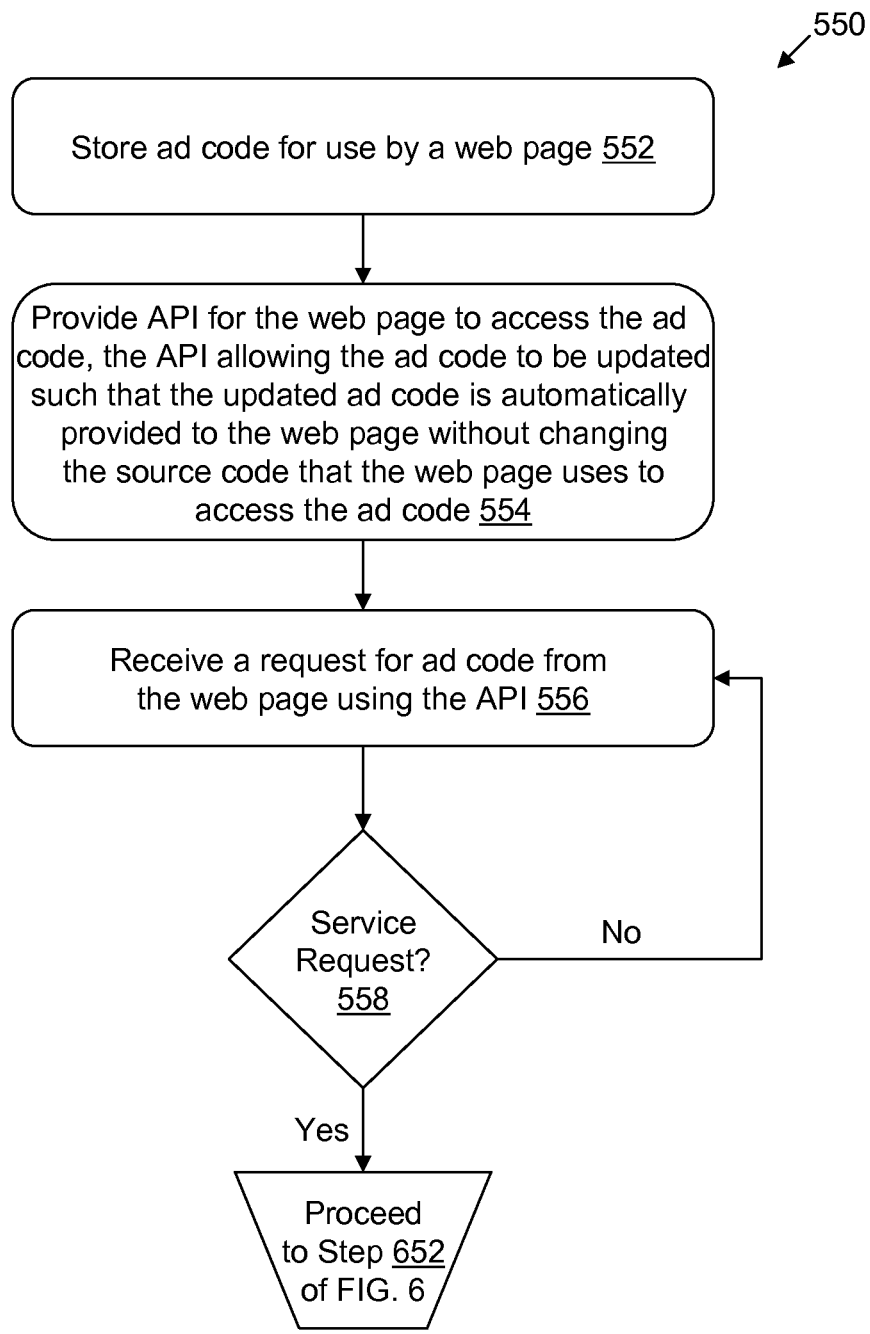
FIG. 5 is a flow chart of an exemplary method for processing a request for advertising code according to the present invention.

FIG. 5 is a flow chart of an exemplary method 550 for processing a request for advertising code according to the present invention. Referring to FIG. 1, at step 552 the ad code storage server 110 stores ad code for use by a web pages (e.g., for use by websites 112). At step 554, the ad code storage server 110 provides an application programming interface (API) for the web page to access the ad code. The API allows the ad code stored by the ad code storage server 110 to be updated such that the updated ad code is automatically provided to a requesting web page without changing the source code that the web page uses to access the ad code. At step 556, the ad code storage server 110 receives a request from a web page (e.g., from a website 112) for ad code stored by the ad code storage server 110. At step 558, the ad code storage server 110 determines whether to service the received request for ad code. If the ad code storage server 110 determines not to service the request, the method 550 proceeds back to step 556. If the ad code storage server 110 determines to service the request, the method 550 proceeds to step 652 of FIG. 6.

Referring to step 552, as described above the ad code storage server 110 stores the ad code for transmission to websites 112. In some embodiments, the ad code (e.g., ad code libraries) stored by the ad code storage server 110 is built by the centralized ad code system 102 from ad code stored on the code repository server 104 and configuration data stored by the database 108. The ad code can be tested by the testing server 106. For example, a new version of ad code in the code repository server 104 is tested by the testing server 106 before it is uploaded to the ad code storage server 110 (e.g., before the ad code is used by live websites 112). The ad code includes both third party vendor code (e.g., ad and reporting code) that is tied together using a library (e.g., a javascript library) that provides a plug-in framework for the technical integration of the third party code.

The ad code can be deployed as one or more files. In some embodiments, the ad code is deployed as a general file (e.g., that contains general code used by all websites 112) and one or more configuration files (e.g., that contain site-specific code for each of the websites 112). For example, the general file can include global variable configurations used by websites 112, javascript modules (e.g., that implement the API), third party vendor code (e.g., ad and/or reporting code as provided by the third party), and/or third party vendor code configurations used by websites 112. The one or more configuration files can include, for example, website 112 specific variables and/or reporting and ad code configuration for the websites 112 (e.g., one configuration file per website 112). Advantageously, global changes can be made to the general file with minimum risk to site-specific code contained in the one or more configuration files. In some embodiments, the centralized ad code system 102 maintains the general file and the websites 112 maintain the one or more configuration files.

The configuration data stored by the database 108 can include, for example, reporting configuration data for each domain used by the websites 112. The configuration data can be stored as records for each brand (e.g., for each website 112). The configuration information can include, for example, parameters for the third party software that are used in the ad buying cycle for advertisers (e.g., parameters for DART by DoubleClick), suite identifiers for the third party software, labels for the third party software, and account identifiers for the third party software. In some embodiments, the database 108 maintains a history table to track changes made to add new and/or alter existing configuration data.

The database 108 can maintain fields to manage access levels for the configuration data. The configuration data records can each include an environment field indicative of whether the configuration data record has passed testing (e.g., via testing server 106). For example, the environment field for a configuration data record can be set to indicate the record is only available to the testing server 106 (e.g., and not for live release by the ad code storage server 110). The environment field can be changed to indicate the record is available for production (e.g., for live release by the ad code storage server 110). Advantageously, new or altered configuration data records can be graduated to production once the testing server 106 conducts proper testing. The database 108 can provide a configuration interface to the testing server 106. The configuration interface can provide the ad and reporting configuration information to the testing server 106 (which assembles the ad code files once a release of ad code has been identified in the code repository server 104).

Referring to step 554, the ad code implements an API 111, as described above, where the website invokes predefined methods that call associated portions of the ad code (e.g., which invoke third party methods based on the associated configuration data for a website 112). Referring to FIG. 3, for example, the ad code implements the init method 302 and the placeAd method 304. Referring to FIG. 4, for example, the ad code implements the init method 402 and the sendPageCall method 404. Advantageously, because the websites 112 call methods defined through the API 111, the associated code in the ad code invoked by the API 111 can be changed without modifying the code of websites 112.

Referring to step 556, a website 112 requests the ad code libraries from the ad code storage server 110 to use for its associated web pages. Referring to FIG. 4, for example, the script tag 401 includes the source attribute 401A and the site attribute 401B that are used to load the ad code file for the requesting website implementing the website code 400. When the website code 400 is loaded (e.g., via a web browser), the browser requests the ad code from the site identified in the source field 401A for the site identified in the site field 401B. In some examples, the website 112 requests an entire ad code library. In some examples, the website 112 requests code from the ad code storage server 110 associated with methods invoked by the website 112. Advantageously, each time a website 112 invokes methods implemented by the API 111, the website 112 requests the most recent code from the ad code storage server 110.

Referring to step 558, as described above the ad code storage server 110 can determine whether or not to service an ad code request from a particular website 112. The ad code storage server 110 can determine whether the second web page is authorized to use the advertising code. If a web page is authorized to use the advertising code, the ad code storage server 110 transmits a reply (e.g., via method 650 of FIG. 6). If a web page is not authorized to use the advertising code, the ad code storage server 110 can transmit a blank response. For example, if the request includes a site parameter that does not match any of the sites stored by the ad code storage server 110, the ad code storage server 110 can determine not to respond to the request. For example, the ad code storage server 110 can determine the request is from a website that is not supported by the ad code storage server 110. Advantageously, the ad code storage server 110 can send a response only to a verified website 112.

Figure 6:
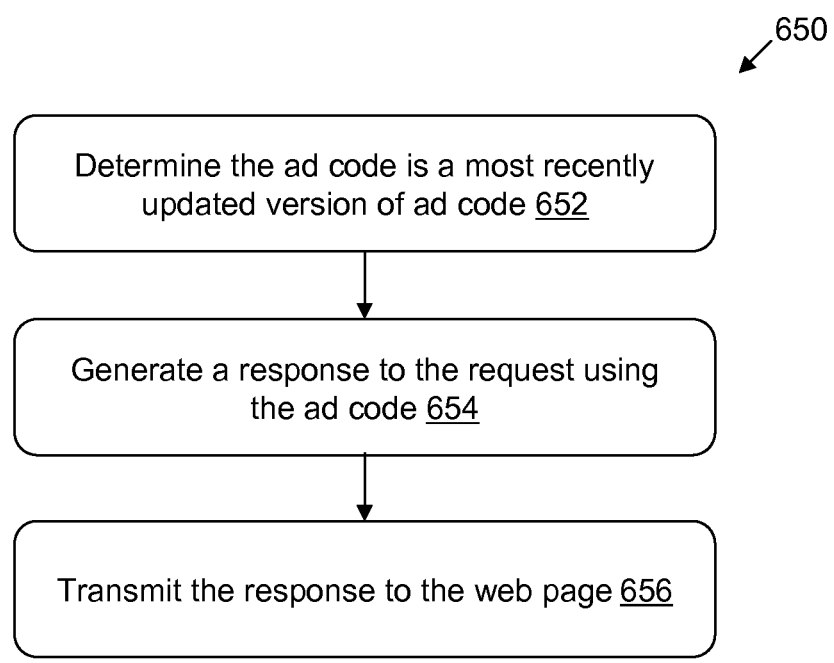
FIG. 6 is a flow chart of an exemplary method for responding to a request for advertising code according to the present invention.

FIG. 6 is a flow chart of an exemplary method 650 for responding to a request for advertising code according to the present invention. Referring to FIG. 1, at step 652 the ad code storage server 110 determines the ad code is a most recently updated version of ad code. At step 654, the ad code storage server 110 generates a response to the request using the ad code. At step 656, the ad code storage server 110 transmits the response to the web page (to the requesting website 112).

Referring to step 652, the ad code storage server 110 determines what ad code the website requested at step 556 of FIG. 5. For example, the request can be a standard ad code request (e.g., a test parameter is not set for the request). In some examples, the request can be a request for a testing version of the ad code that is not yet deployed for live use by websites 112. Advantageously, for a standard ad code request, the ad code storage server 110 can respond with the most recently updated version of ad code stored by the ad code storage server 110.

Referring to steps 654 and 656, the ad code storage server 110 transmits a response to the web page that includes the requested ad code. For example, if the webpage 112 requested an ad code library (e.g., a javascript library) from the ad code storage server 110, the ad code storage server 110 transmits the ad code library to the website 112. As another example, if the webpage 112 request a portion of the ad code library (e.g., only ad code associated with methods called by the website 112's code), the ad code storage server 110 transmits the ad code library portions to the webpage 112. Advantageously, the ad code can be transmitted to a website 112 at run-time (e.g., when web pages for the website are loaded at runtime). In some embodiments, even though the same ad code is transmitted to the websites 112 from the ad code storage server 110, each website 112 can customize the ad code to serve the individual needs of the website 112 (e.g., different brands may want to report fields particular to their own needs).

Figure 7:
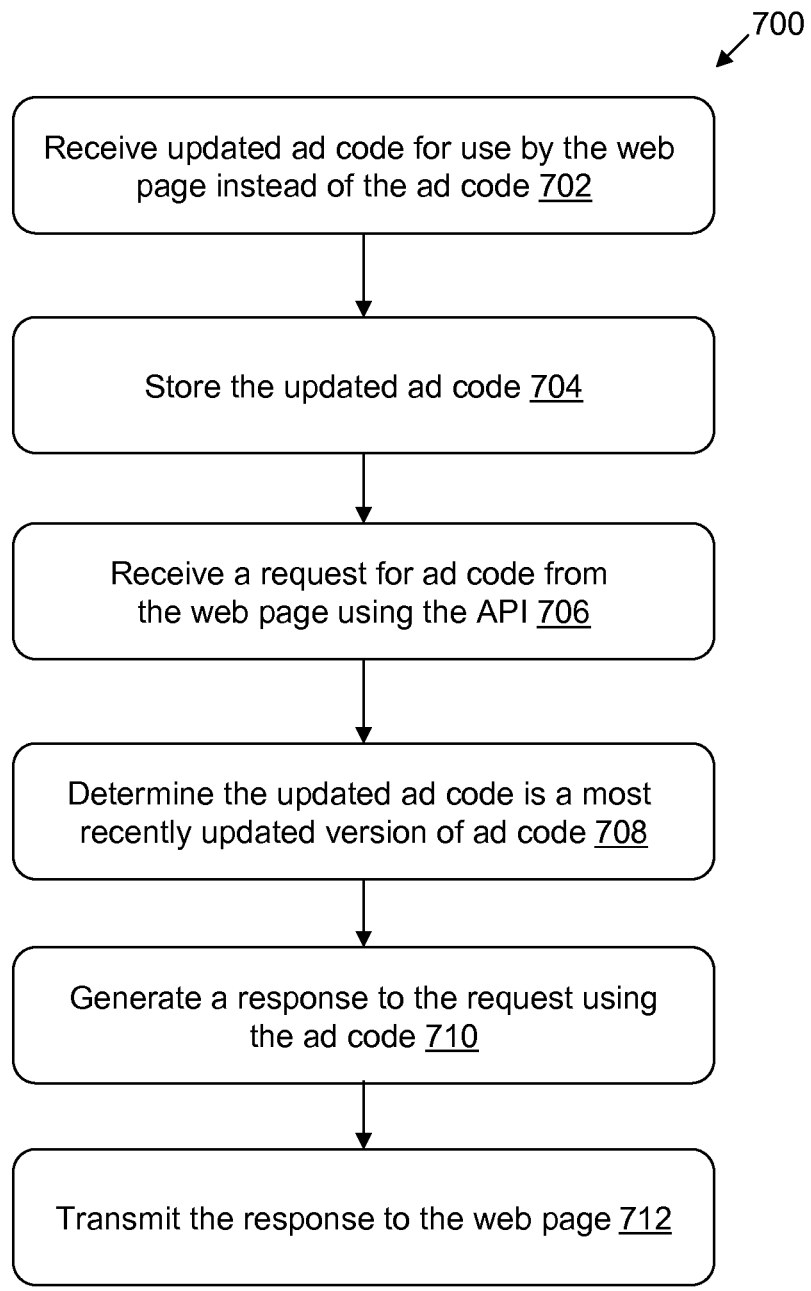
FIG. 7 is a flow chart of an exemplary method for processing updated advertising code according to the present invention.

Websites 112 implement the API 111, and therefore request ad code from the centralized ad code system 102 when invoked (e.g., when a webpage associated with website 112 is loaded in a browser). Advantageously, the ad code can be changed and updated without affecting websites 112. FIG. 7 is a flow chart of an exemplary method 700 for processing updated advertising code according to the present invention. Referring to FIG. 1, at step 702 the ad code storage server 110 receives updated advertising code for use by the web page instead of the advertising code currently stored by the ad code storage server 110 (e.g., received from the testing server 106 or from the code repository server 104). At step 704, the ad code storage server 110 stores the updated advertising code. At step 706, the ad code storage server 110 receives a request for advertising code from a web page associated with a website 112 that is using the application programming interface 111. At step 708, the ad code storage server 110 determines the updated advertising code is the most recently updated version of advertising code stored by the computing device. At step 710, the ad code storage server 110 generates a response to the request using the updated advertising code. At step 712, the ad code storage server 110 transmits the response to the web page.

Referring to step 702, the ad code storage server 110 can receive a file transfer protocol publication that includes the updated advertising code. In some examples, the testing server 106 can determine updated advertising code in the code repository server 104 is ready for testing. The testing server 106 can test the updated advertising code before uploading the updated advertising code to the ad code storage server 110. In some examples, the testing server 106 uploads the updated advertising code to the ad code storage server 110 if the updated advertising code completed testing by one or more web pages. For example, as described above websites 112 can set a testing parameter in ad code requests to the centralized ad code system 102. The websites 112 can test the updated ad code to verify its integrity (e.g., that there are no software bugs or glitches) prior to uploading the updated ad code to the ad code storage server 110 for use by websites 112.

As described above, the website 112 code may not require any changes because the website 112 implements methods provided through API 111. For example, referring to FIG. 3, the website code can remain static with the init method 302 and the placeAdd method 304. Advantageously, the underlying ad code stored by the centralized ad code that implements the init method 302 and the placeAdd method 304 can be updated and revised as necessary. Referring to method 700, the ad code storage server 110 can automatically transmit updated ad code in response to a request from a website 112 for ad code.

Advantageously, the centralized ad code system 102 centralizes the hosting of ad and reporting code, such as third party vendor ad and reporting code. Developers can easily use the methods provided through the API 111 without needing to understand the underlying code (e.g., how the underlying code works). Network wide control can be effectuated over the quality and kind of data collected by the centralized ad code system 102. New ad and reporting technologies can be adapted into the ad code (e.g., into the code in the code repository server). Old, outdated, and/or unwanted technologies can be removed from the ad code. Advantageously, because the ad code is consolidated within the centralized ad code system 102, only one change to the ad code needs to be made to effectuate the change across all of the websites 112.

The centralized ad code system 102 also facilitates the establishment of universal standards for quality assurance. As described above with reference to the testing server 106, any changes to the ad and reporting software stored in the code repository server 104 can be tested by the testing server 106 before being uploaded to the ad code storage server 110 (e.g., a network storage device, such as an FTP repository). Each change can be subject to, for example, uniform testing prior to live deployment for use by websites 112.

Ad reporting and targeting can also be performed across domains. For example, by writing a cookie to a main domain serviced by the centralized ad code system 102, the websites 112 can glean a better understanding of a shared audience within the sub-domains serviced by the main domain. Such knowledge can be used to enhance the effectiveness of cross-brand marketing (e.g., which can increase traffic, improve search engine rankings, etc.). Cross-domain traffic data can be used to target cross-brand audience segments.

The above-described systems and methods can be implemented in digital electronic circuitry, in computer hardware, firmware, and/or software. The implementation can be as a computer program product (i.e., a computer program tangibly embodied in an information carrier). The implementation can, for example, be in a machine-readable storage device, for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the invention by operating on input data and generating output. Method steps can also be performed by and an apparatus can be implemented as special purpose logic circuitry. The circuitry can, for example, be a FPGA (field programmable gate array) and/or an ASIC (application-specific integrated circuit). Modules, subroutines, and software agents can refer to portions of the computer program, the processor, the special circuitry, software, and/or hardware that implements that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer can include, can be operatively coupled to receive data from and/or transfer data to one or more mass storage devices for storing data (e.g., magnetic, magneto-optical disks, or optical disks).

Data transmission and instructions can also occur over a communications network. Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above described techniques can be implemented on a computer having a display device. The display device can, for example, be a cathode ray tube (CRT) and/or a liquid crystal display (LCD) monitor. The interaction with a user can, for example, be a display of information to the user and a keyboard and a pointing device (e.g., a mouse or a trackball) by which the user can provide input to the computer (e.g., interact with a user interface element). Other kinds of devices can be used to provide for interaction with a user. Other devices can, for example, be feedback provided to the user in any form of sensory feedback (e.g., visual feedback, auditory feedback, or tactile feedback). Input from the user can, for example, be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributing computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication (e.g., a communication network). Examples of communication networks include a local area network (LAN), a wide area network (WAN), the Internet, wired networks, and/or wireless networks.

The system can include clients and servers. A client and a server are generally remote from each other and typically interact through a communication network. The relationship of client and server arises by virtue of computer programs running on the respective computers and having a client-server relationship to each other.

Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network (e.g., RAN, bluetooth, code-division multiple access (CDMA) network, time division multiple access (TDMA) network, global system for mobile communications (GSM) network), and/or other circuit-based networks.

The transmitting device can include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer) with a world wide web browser (e.g., Microsoft® Internet Explorer® available from Microsoft Corporation, Mozilla® Firefox available from Mozilla Corporation). The mobile computing device includes, for example, a personal digital assistant (PDA).

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

What is claimed is:

1. An apparatus for automatically providing updated advertising code to a plurality of web pages, the apparatus comprising:
    a computing device with a processor and memory and a first testing server configured to:
        store advertising code for use by a web page, the advertising code comprising at least one of vendor advertising code or vendor reporting code;
        provide an application programming interface for the web page to access the advertising code, the application programming interface allowing the advertising code to be updated such that updated advertising code is automatically provided to the web page without changing source code that the web page uses to access the advertising code;
        receive a request for advertising code from the web page using the application programming interface;
        determine whether the advertising code is an updated version of advertising code stored by the computing device;
        send, when the advertising code is determined to be the updated version of the advertising code stored by the computing device, the updated version of the advertising code to the first testing server for testing;
        generate a response to the request using the tested advertising code; and
        transmit the response to the web page.

2. The apparatus of claim 1 being further configured to:
    receive updated advertising code for use by the web page instead of the advertising code;
    store the updated advertising code;
    receive a second request for advertising code from the web page using the application programming interface;
    determine the updated advertising code is the most recently updated version of advertising code stored by the computing device; and
    generate a second response to the second request using the updated advertising code.

3. The apparatus of claim 1 further comprising a second testing server in communication with the first testing server and the computing device configured to:
    store the updated advertising code after completing a portion of testing; and
    store a backup of the advertising code when the updated advertising code is uploaded to the computing device so the backup of the advertising code can be reverted back to if the updated advertising code comprises one or more errors.

4. The apparatus of claim 1 further comprising a database in communication with the computing device configured to store one or more configuration parameters for each web page accessing the advertising code that can be set to customize the advertising code for each web page.

5. A computerized method for automatically providing updated advertising code to a plurality of web pages comprising:
    storing, by a computing device, advertising code for use by a web page, the advertising code comprising at least one of vendor advertising code or vendor reporting code;
    providing, by the computing device, an application programming interface for the web page to access the advertising code using source code, the application programming interface allowing the advertising code to be updated such that updated advertising code is automatically provided to the web page without changing the source code that the web page uses to access the advertising code;
    receiving, by the computing device, a request for advertising code from the web page using the application programming interface;
    determining whether the advertising code is an updated version of advertising code stored by the computing device;
    sending, when the advertising code is determined to be the updated version of the advertising code stored by the computing device, the updated version of the advertising code to a testing server for testing;
    generating, by the computing device, a response to the request using the tested advertising code; and
    transmitting to the web page, by the computing device, the response.

6. The method of claim 5 wherein the advertising code is stored for use by a plurality of web pages.

7. The method of claim 5 wherein the application programming interface comprises:
    one or more advertising functions for manipulating an advertisement on the web page; and
    one or more configuration parameters that can be set for the web page to customize the advertising code for the web page.

8. The method of claim 7 wherein the application programming interface comprises an advertising function for placing an advertisement in a webpage that is configured such that when the advertising function is executed by a web page, the advertising function calls a portion of the vendor advertising code based on the one or more configuration parameters for the web page.

9. The method of claim 5 wherein the application programming interface comprises:
    one or more reporting functions for monitoring data related to an advertisement on the web page; and
    one or more configuration parameters that can be set for the web page to customize the advertising code for the web page.

10. The method of claim 9 wherein the application programming interface comprises a reporting function for reporting one or more statistics for an advertisement in the web page that is configured such that when the reporting function is executed by the web page, the reporting function calls a portion of the vendor reporting code based on the one or more configuration parameters for the web page.

11. The method of claim 5 further comprising monitoring use of the advertising code by a plurality of web pages.

12. The method of claim 5 wherein storing comprises receiving a file transfer protocol publication including the advertising code.

13. The method of claim 5 comprising:
receiving updated advertising code for use by the web page instead of the advertising code;
storing the updated advertising code;
receiving a second request for advertising code from the web page using the application programming interface;
determine the updated advertising code is the most recently updated version of advertising code stored by the computing device; and
generating a second response to the second request using the updated advertising code.

14. The method of claim 5 comprising:
receiving a request comprising data indicative of a function call implemented by the application programming interface from a second web page; and
determining whether to service the function call based on the second web page.

15. The method of claim 14, wherein determining comprises:
determining whether the second web page is authorized to use the advertising code;
if the second web page is authorized to use the advertising code, transmitting a reply to the second web page based on the advertising code; and
if the second web page is not authorized to use the advertising code, transmitting a blank response to the second web page.

16. The method of claim 5 further comprising uploading the updated advertising code to the computing device if the updated advertising code completed testing by one or more web pages.

17. The method of claim 5 wherein testing comprises:
receiving a second request for advertising code from a second web page using the application programming interface, wherein the request comprises a cookie including data indicative of the second web page requesting the updated advertising code; and
generating a second response to the to the second web page using the updated advertising code so the second web page can test the update.

18. A computer program product, tangibly embodied in a non-transitory computer readable medium, the computer program product including instructions being configured to cause a data processing apparatus to:
store advertising code for use by a web page, the advertising code comprising at least one of vendor advertising code or vendor reporting code;
provide an application programming interface for the web page to access the advertising code, the application programming interface allowing the advertising code to be updated such that updated advertising code is automatically provided to the web page without changing source code that the web page uses to access the advertising code;
receive a request for advertising code from the web page using the application programming interface;
determine whether the advertising code is an updated version of advertising code stored by the computing device;
send, when the advertising code is determined to be the updated version of the advertising code stored by the computing device, the updated version of the advertising code to a testing server for testing;
generate a response to the request using the tested advertising code; and
transmit the response to the web page.

* * * * *

UNITED STATES PATENT AND TRADEMARK OFFICE
CERTIFICATE OF CORRECTION

PATENT NO. : 9,911,142 B2
APPLICATION NO. : 12/965409
DATED : March 6, 2018
INVENTOR(S) : Hannon et al.

Page 1 of 1

It is certified that error appears in the above-identified patent and that said Letters Patent is hereby corrected as shown below:

In the Claims

Column 20, Line 7 should be replaced with the following line:
"generating a second response to the second web"

Signed and Sealed this
Eleventh Day of June, 2019

Andrei Iancu
*Director of the United States Patent and Trademark Office*